UNITED STATES PATENT OFFICE.

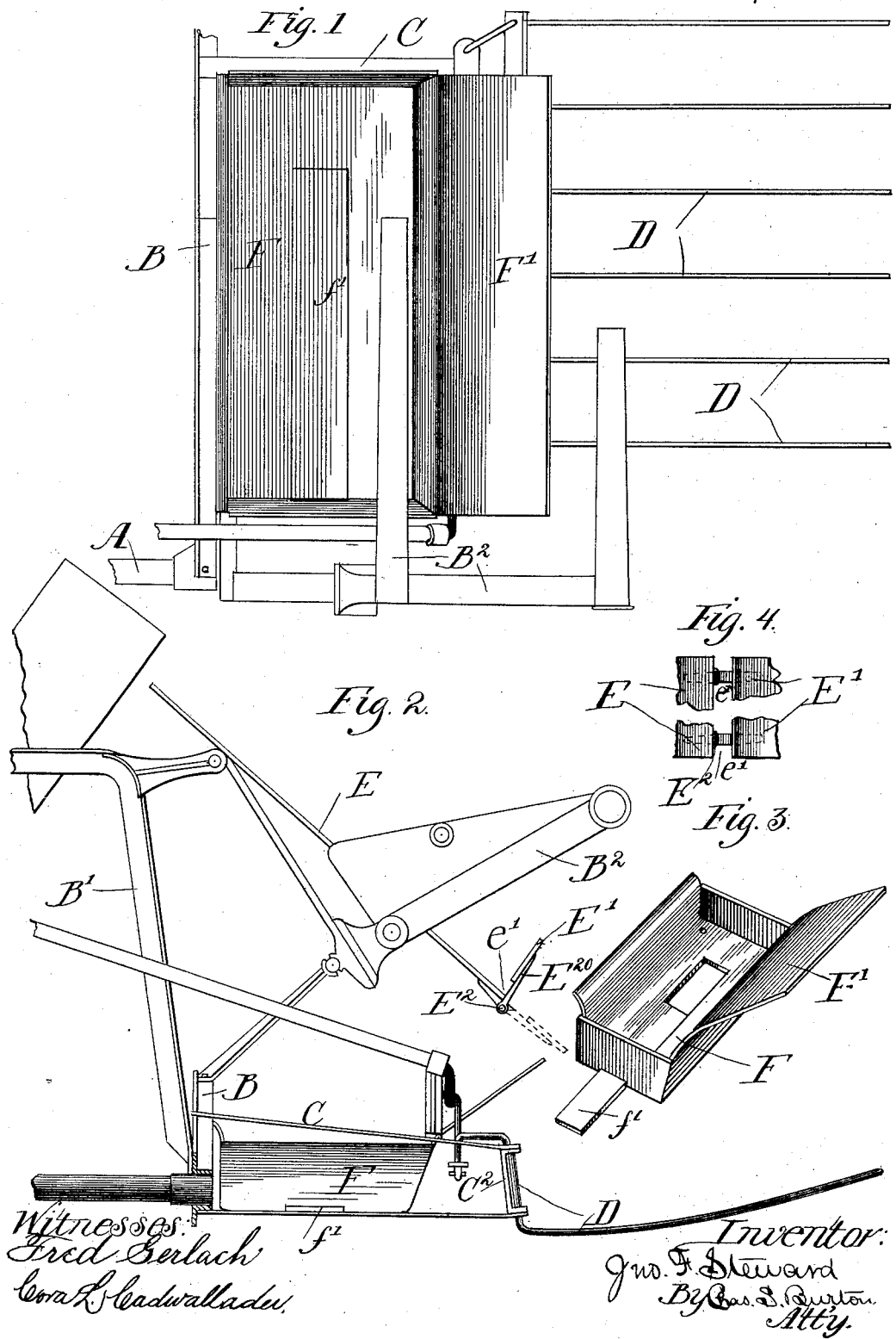

JOHN F. STEWARD, OF CHICAGO, ILLINOIS.

LOOSE-GRAIN RECEPTACLE FOR SELF-BINDERS.

SPECIFICATION forming part of Letters Patent No. 364,380, dated June 7, 1887.

Application filed January 31, 1887. Serial No. 226,017. (No model.)

*To all whom it may concern:*

Be it known that I, JOHN F. STEWARD, a citizen of the United States, residing at Chicago, in the county of Cook and State of Illinois, have invented certain new and useful Improvements in Loose-Grain Receptacles for Self-Binders, which are fully set forth in the following specification, reference being had to the accompanying drawings, forming a part thereof.

Figure 1 is a plan of a portion of a harvester and binder frame and a bundle-carrier connected therewith, and the device which constitutes my invention shown in its relation to said other parts. Fig. 2 is a rear elevation of the same matters shown in Fig. 1, showing in addition the binder-deck and binder-frame supports. Fig. 3 is a perspective of a box or tray which is used in my invention to receive loose grain. Fig. 4 is a detail plan of a small portion of the deck and end-gate, showing an aperture between them.

A is the rear sill of the harvester. B B are the bars of a frame constituting the stubble end of the harvester-frame. B' is an upright post forming a support at the rear outer corner for the binder-frame work. $B^2$ is a binder-frame. C and C' are respectively the upper and lower bars of the bundle-carrier frame. D are the bundle-carrier arms supported by the frame C. E is the binder-deck; E', the end-gate hinged to the binder-deck at the discharge side. F is the loose-grain receptacle or tray; F', a chute-board formed as an extension of one side of the tray F, and forming a lip thereon.

This invention is designed to be applied particularly in connection with bundle-carrying devices which are permanently attached to the harvester with which they operate, and particularly to that class of bundle-carriers which have their supporting frame-work extended underneath the binder-deck fastened to the stubble end of the harvester-frame; and the particular form of bundle-carrier which I have selected to illustrate the application of my invention is immaterial, except in that it has such a supporting-frame composed of the arms C and C'. Said arms are secured, respectively, to the upper and lower bars, B, of the trussed frame which constitutes the stubble end of the harvester, as above stated, and extend stubbleward from such connection, and have the bundle-carrier arms D pivoted to them at their outer ends, said ends being preferably joined to make the structure rigid, as by the channel-iron bar $C^2$. Upon the lower bars, C', of this carrier-supporting frame is supported the loose-grain receptacle F. It has a chute-board or lip, F', extending upward and outward between the two upper bars, C, at a point farther outward than the outer edge of the binder-deck E, so that any loose grain dropping over the edge of said deck will be received upon said chute-board and conducted into the receptacle F.

In order that the end-gate E' may not prevent the grain which may shell out on the binder-deck from falling, so as to be received by the chute-board F', and may not, when it is extended in line with the deck, act to conduct such loose grain too far stubbleward to be caught by the chute-board in falling, I fasten said gate-board to the deck by the arms $E^{20}$ of the hinges $E^2$, leaving an interval between the edge of the deck and the proximate edge of the gate, so that an aperture, $e'$, exists between the deck and said gate, whatever be the position of the gate, whether upright, as shown in Fig. 2, or extended, as when the bundle is being ejected over it, and as shown in dotted lines in said Fig. 2.

The operation of this device is obvious from its structure, as above explained. Any grain which may be shelled out in the process of binding and left upon the binder-deck will roll downward over the edge of said deck through the rift $e'$ between the deck and the end-gate and fall upon the chute-board F', to be by it conducted into the receptacle F underneath the binder-deck.

For convenience in removing the contents of the receptacle F without detaching it from the supporting-frame bars C', I provide the slide-gate $f'$ in the bottom of said receptacle, which being withdrawn endwise, as illustrated in Fig. 3, will permit the discharge of the grain from the receptacle into any vessel adapted and placed to receive it. The receptacle F may be secured either temporarily or permanently to the bars C', upon which it is supported by bolts $f^{10}$.

I claim—

1. In combination with the harvester-frame, the binder-deck sustained thereby and sloping downward and stubbleward to the discharge edge, the bundle-carrier frame, also secured to the harvester-frame below the deck, and the bundle-carrier supported by said frame in position to receive the straw or bundles discharged off the deck, and the loose-grain receptacle sustained upon the bundle-carrier frame under the binder-deck and located grainward from the vertical plane of the discharge edge of the deck, and having an inclined lip or chute-board extending upward and stubbleward to a point stubbleward of the vertical plane of said discharge edge and below the horizontal plane of said edge, whereby the slope of the deck tends to cause the straw and bundles to pass stubbleward onto the bundle-carrier, while the loose grain passes grainward into the receptacle, substantially as set forth.

2. In combination with the binder-deck, the gate at the discharge side hinged thereto, leaving an interval producing an aperture, $e'$, the loose-grain receptacle supported underneath the deck, provided with the chute-board $F'$, sloping upward and outward under said aperture, whereby the loose grain from the deck is discharged through the aperture, received on the chute-board, and guided into the receptacle under the deck, substantially as set forth.

In testimony whereof I have hereunto set my hand, this 28th day of January, A. D. 1887, in the presence of two witnesses, at Chicago, Illinois.

JOHN F. STEWARD.

Witnesses:
GEORGE H. SPAULDING,
WILFRED TWINCH.